J. R. GAMMETER.
ART OF MAKING CORD TIRES AND TIRE MAKING CORD BAND THEREFOR.
APPLICATION FILED JULY 3, 1917.
1,313,286.
Patented Aug. 19, 1919.
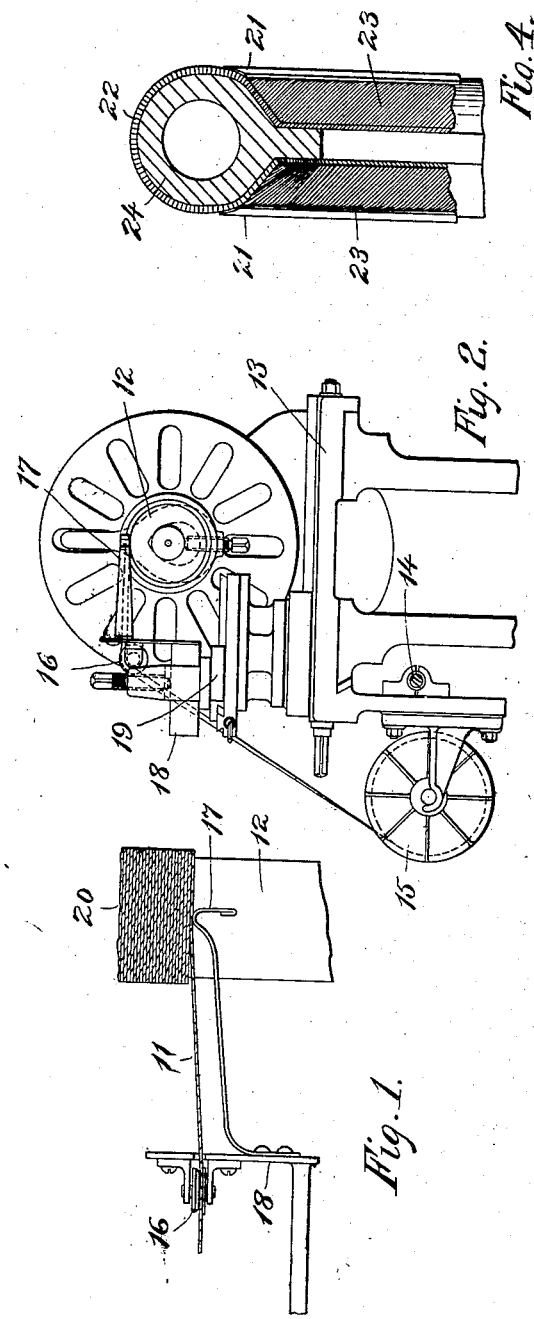
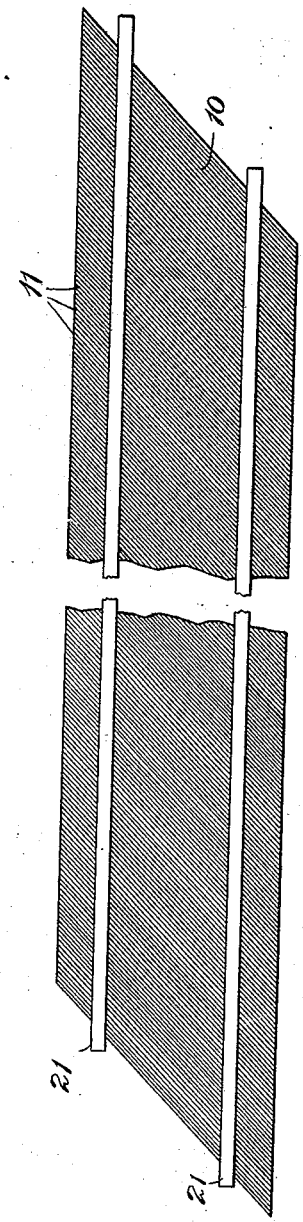
INVENTOR
BY J. R. Gammeter
Robert M. Pierson
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

ART OF MAKING CORD TIRES AND TIRE-MAKING CORD BAND THEREFOR.

1,313,286.  Specification of Letters Patent.  Patented Aug. 19, 1919.

Application filed July 3, 1917. Serial No. 178,351.

*To all whom it may concern:*

Be it known that I, JOHN R. GAMMETER, a citizen of the United States, residing at Akron, in the county of Summit and State of Ohio, have invented certain new and useful Improvements in the Art of Making Cord Tires and Tire-Making Cord Band Therefor, of which the following is a specification.

This invention relates to the manufacture of cord tires, and its object is to lay the plies of diagonally-extending cords in strip or sheet form upon the annular core or mandrel in such manner that the previously-flat cord strip may have its middle or tread portion stretched in applying it to the core and its margins condensed by stitching or tooling without substantially altering the length of the ply at an intermediate line or circle on each side of the carcass, which may be termed the neutral line. Consequently, with the aid of my invention, the individual cords may readily be made to lie substantially on the shortest line or path from one bead to the other, giving the tire increased strength and durability.

Of the accompanying drawings,

Figure 1 is a fragmental plan view showing the mode of winding cord on a straight drum or mandrel to produce a tube which is afterward slit helically to make the bias-cut cord band.

Fig. 2 is an end view which illustrates the winding operation in a lathe.

Fig. 3 is a plan view broken in the middle showing the bias-cut cord band with inextensible neutral-line tapes applied thereto in accordance with my invention.

Fig. 4 is a fragmental cross-section and elevation of a tire-forming core with the taped cord ply laid on and conforming to said core.

In the drawings, 10 is the flat tire-forming band whose cords 11 are laid on the bias or at an angle to the side edges thereof, said angle being preferably about 45°. The cords are preferably impregnated and coated with raw rubber so as to adhere to each other while being manipulated, and also to furnish a separation between said cords in the tire carcass. A suitable way to apply the rubber is to lay a sheet of raw gum around the straight drum or mandrel upon which the cord is wound to produce the band, and then to wind the rubberized cord over said sheet and coat the same with rubber cement. An outer sheet of rubber gum is then applied, either while the cord is still on the mandrel or after the cord band has been cut off and applied to the tire-making core.

Figs. 1 and 2 represent the winding method of producing the band. 12 is a straight winding drum or mandrel which is placed between the centers of the lathe shown in Fig. 2, and is rotated thereby while the cord is wound and spaced by suitable devices mounted upon the longitudinal sliding carriage 13 actuated by the feed-screw 14. 15 is a cord supply reel or spool mounted upon the apron of the carriage, and 16, 17 are respectively a guide-roller and a laterally-acting spring presser-arm mounted upon a suitable bracket 18 which is carried by the cross-feed tool support 19 on the lathe. By suitably adjusting the rate of feed of the carriage 13 with reference to the peripheral speed of the drum 12, a cord tube 20 is wound upon the mandrel with the desired number of closely-abutting turns. This tube is then slit on a steep helical path in a well-known manner, at the desired angle to the cords, such as 45°, and the strip is peeled off and laid out flat on a table, its form being then as shown in Fig. 3. It will be understood, however, that the band of Fig. 3 may be made in any other suitable way.

I then apply to the band 10 a pair of substantially-inextensible tapes 21, parallel to each other and to the side edges of the band, along certain neutral lines which will have an intermediate position on the side of the tire-forming core substantially as shown in Fig. 4, the crown or tread portion 22 of the formed ply being included between the two tapes, and the skirts or margins 23, which lie against the under-cut sides, being located at the outer edges. The tapes 21 may be of any suitable material and structure such as braided cotton yarn or straight woven fabrics, and they are caused to adhere to the tacky surface of the cord band by pressing them against the latter.

The taped cord band shown in Fig. 3 may be manipulated into tire form in very much the same way as a ply of bias-cut frictioned woven fabric, being applied to and shaped upon the tire-forming core 24 either by hand or machine processes, or a combination of the two. The cord band readily stretches to conform to the greater diameter of the crown or tread 22, while the tapes 21 prevent it from elongating substantially at the neutral side lines. Then, either following or during the operation of stretching the ply upon the core, the margins 23 are tooled or stitched in a well-known way in order to make them lie smoothly upon the undercut sides of the core. The neutral-line tapes enable the operator readily to lay the individual cords in substantially "straight" lines, forming the shortest paths from bead to bead, so that the tire will possess maximum strength and durability. After the first or inner ply has been laid, I prefer to remove the tapes 21 therefrom and likewise from each succeeding ply, the tapes thus performing only a temporary function in the course of manufacture. The next succeeding ply preferably has its cords slanting in the opposite direction, substantially at right angles to those of the first ply, and the tire carcass is thus built up in two or more plies according to the size of the cord or type and size of tire.

I claim:

1. The method of making a cord band for tires which consists in producing a band of bias-laid cords, rendering said band substantially inextensible along an intermediate longitudinal side line thereof at a substantial distance away from the bead location, and stretching said band on the outer side and condensing it on the inner side of said line.

2. The method of making cord tires which consists in providing a band of bias-laid cords, rendering the same substantially inextensible along two parallel lines located between a middle zone and two marginal zones along lines corresponding to circles positioned about half-way up the sides of the tire and stretching the band in said middle zone and condensing it in the marginal zones in the act of incorporating said band into the tire.

3. The method of making cord tires which consists in providing a band of bias-laid rubberized cords, laying a pair of substantially-inextensible neutral-line tapes longitudinally of said band so as to divide the same into a middle or tread zone and two marginal zones, wrapping said strip upon a tire-forming core and stretching the tread portion thereof during the wrapping, condensing the margins of said strip against the undercut sides of the core and finally removing said tapes.

4. A tire-making cord strip composed of bias-laid rubberized cord-elements, and having a pair of longitudinally-extending substantially-inextensible elements located along two longitudinal lines dividing said band into a middle or tread zone and two marginal zones.

5. A tire-making cord band composed of rubberized bias cords and a pair of longitudinally-extending substantially-parallel tapes attached to said band on either side of its middle.

6. A tire-making cord band composed of rubberized bias-laid cords and a pair of longitudinally-extending substantially-inextensible tapes adhesively applied thereto on either side of the middle, each about midway of one half of said band.

In testimony whereof I have hereunto set my hand this second day of July 1917.

JOHN R. GAMMETER.

Copies of this patent may be obtained for five cents each, by addressing the "Commissioner of Patents, Washington, D. C."